United States Patent
Shackelford et al.

(10) Patent No.: US 6,196,623 B1
(45) Date of Patent: Mar. 6, 2001

(54) VEHICULAR CLOTHING PROTECTOR

(75) Inventors: Jon E. Shackelford, Clarkston; Joseph W. Tasch, Oxford; Gregory E. Price, Lakeville, all of MI (US)

(73) Assignee: Beacon Development Corp., Ortonville, MI (US)

( * ) Notice: Subject to any disclaimer, the term of this patent is extended or adjusted under 35 U.S.C. 154(b) by 0 days.

(21) Appl. No.: 08/817,106

(22) PCT Filed: Jan. 21, 1997

(86) PCT No.: PCT/US97/00603

§ 371 Date: Apr. 7, 1997

§ 102(e) Date: Apr. 7, 1997

(87) PCT Pub. No.: WO97/26176

PCT Pub. Date: Jul. 24, 1997

Related U.S. Application Data

(60) Provisional application No. 60/020,069, filed on Jun. 17, 1996, and provisional application No. 60/010,383, filed on Jan. 22, 1996.

(51) Int. Cl.[7] .................................................. B62D 25/22
(52) U.S. Cl. ............................................................. 296/199
(58) Field of Search ............................. 296/199; 280/850, 280/164.2, 166; 49/303, 304, 305, 310, 313, 314

(56) References Cited

U.S. PATENT DOCUMENTS

| | | | |
|---|---|---|---|
| 2,240,181 | 4/1941 | Fairbank | 296/199 |
| 5,129,678 | 7/1992 | Gurbacki | 280/770 |
| 5,193,869 | 3/1993 | Land | 293/128 |

Primary Examiner—Andrew C. Pike
(74) Attorney, Agent, or Firm—Reising, Ethington, Barnes, Kisselle, Learman & McCulloch P.C.

(57) ABSTRACT

A clothing protector assembly (34) for an automobile (10) prevents a person's shoes and clothes from brushing against the automobile's (10) exterior body surface (12) and becoming soiled with dirt, mud, snow, salt, and other debris during entry and exit. The clothing protector assembly (34) includes a guard (36), which is automatically moved to an extended position when the door (20) is opened to hold clothing away from the exterior body surface (12). When the door (20) closes, the guard (36) is pushed back to its retracted position. Alternatively, a motor (172) or a mechanical linkage (274) tied to the door (220) can be used to extend and retract the guard (36). A extension lock feature (76) holds the guard (36) in the fully extended position, as when leaned against. The automobile door (120) may be of the sliding van type. The clothing protector assembly (134, 234) can also be installed in the rear hatch (114) or trunk (214) area of an automobile (110, 210), with the guard (136, 236) covering the rear bumper (132, 232) and other dirty portions of the exterior body surface (112, 212) whenever the hatch (120) or trunk (220) is opened to protect clothing during loading and unloading of cargo.

41 Claims, 9 Drawing Sheets

VEHICULAR CLOTHING PROTECTOR

This application claims the benefit of U.S. Provisional Application Ser. No. 60/020,069 filed Jun. 17, 1996, and U.S. Provisional Application Ser. No. 60/010,383 filed Jan. 22, 1996.

TECHNICAL FIELD

The subject invention is directed toward an accessory for an automobile which is positioned in a doorway or the trunk/hatch area and extends and retracts as the automobile door, trunk, or hatch is opened and closed to guard a person's clothes and shoes from contact with the dirty vehicle exterior upon entering and exiting the automobile, or when loading and unloading cargo.

BACKGROUND OF THE INVENTION

The exterior surfaces of an automobile are often coated with dirt, mud, snow, salt, sludge, chemicals, and other debris, hereinafter collectively referred to as "soils". These soils collect most predominately along the outer sill panel, or sometimes referred to as the lower rocker panel, of the automobile where the tires tend to discharge. Upon entering and exiting the passenger compartment of the automobile, a person's shoes or clothes, such as a pant leg or overcoat, frequently brush against the outer sill panel. This causes a transfer of the soils collected along the outer sill panel onto the person's clothes.

This problem is compounded when the vehicle has a high ground clearance, such as with the sport/utility type vehicles, when it is difficult to plant one's foot a safe distance from the automobile to prevent clothing contact with the outer sill panel. Also, physically impaired and elderly persons often do not have the muscle strength needed to step into and out of an automobile from a safe distance so as to prevent clothing contact with the outer sill panel. A similar problem arises for most people when loading and unloading cargo items through the doorway in an automobile. When the cargo item is heavy or particularly fragile, or when placing children in car seats and the like, it is difficult to maintain sufficient body spacing from the vehicle exterior so as to prevent pant legs and overcoats from contacting the protruding edge of the outer sill panel which may be covered with soils. Likewise, when loading and unloading cargo items into the trunk compartment or rear hatch area, a person's legs and midsection often brush against the dirty rear bumper.

To help reduce the collection of soils along the exterior of the automobile, the prior art has long taught the use of fender attached mud guards to block and deflect discharge from the front tires. While this treatment is somewhat effective, it will not completely prevent the collection of soils along the protruding edge of the outer sill panels. Hence, it is inevitable that a person's clothing will become soiled as a result of contact with the dirty automobile exterior. Furthermore, mud guards are considered unattractive by many people and can spoil the aesthetic appearance of the automobile exterior.

SUMMARY OF THE INVENTION AND ADVANTAGES

The subject invention is directed toward an automobile and clothing protector assembly combination comprising an automobile having an exterior body surface susceptible to the collection of soils and an opening formed in the exterior body surface. The opening includes a sill. A panel is supported on the automobile for movement between an open position allowing human body movement through the opening and a closed position generally covering the opening. The improvement of the subject invention comprises a clothing protector assembly supported adjacent the sill and having a guard moveable between an extended position protruding outwardly from the opening when the panel is in the open position to hold clothing away from the exterior body surface during human body movement through the opening and a retracted position when the panel is in the closed position.

The subject invention also contemplates a clothing protector assembly for an automobile of the type having a panel moveably mounted in an opening with an underlying sill. The clothing protector assembly comprises a base for attaching to the automobile adjacent the sill, and a guard moveably supported on the base between an extended position for protruding outwardly from the opening to hold clothing away from the exterior body surface of the automobile during human body movement through the opening and a retracted position.

The subject invention also contemplates a method for protecting clothing from the dirty exterior surface of an automobile comprising the steps of: providing an automobile having an exterior body surface susceptible to the collection of soils and an opening formed in the exterior body surface, the opening including an underlying sill; supporting a panel on the automobile for movement between an open position allowing human body movement through the opening and a closed position generally covering the opening; and extending a guard outwardly from the opening when the panel is in its open position to hold clothing away from the exterior body surface during human body movement through the opening and retracting the guard to a protected position when the panel is in its closed position.

The moveable guard overcomes the problems inherent in all automobiles wherein the soils collected about the exterior surfaces of the automobile naturally transfer onto a person's shoes or clothes while entering and exiting the passenger compartment of the automobile, or loading and unloading cargo from the trunk or hatch area. The subject moveable guard prevents, or at least substantially reduces the likelihood of, soil transfer from the automobile exterior onto the person's clothing.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
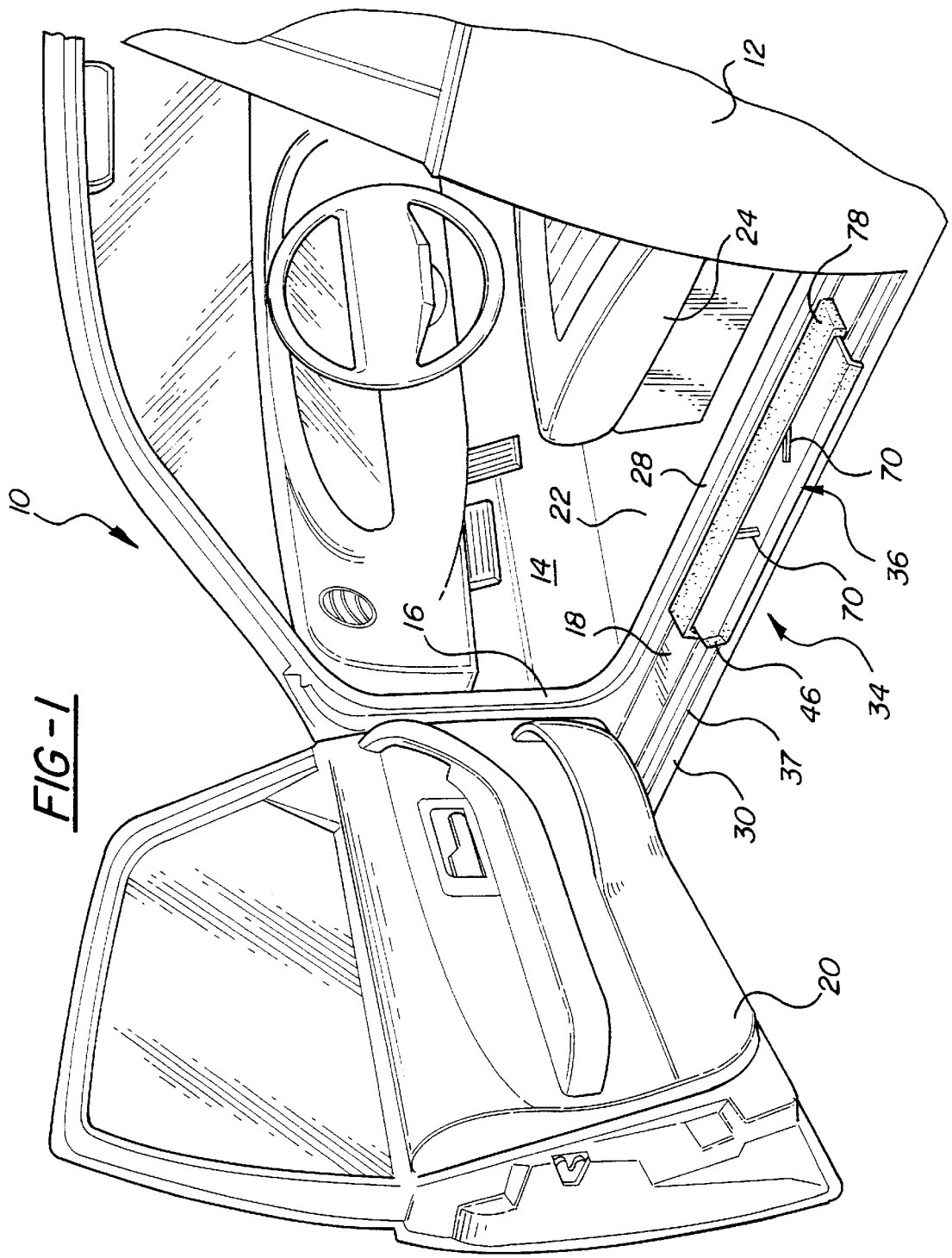
FIG. 1 is a perspective view of a clothing protector assembly according to the subject invention attached to the driver's door sill of an automobile with the guard in an extended position.
Figure 9:
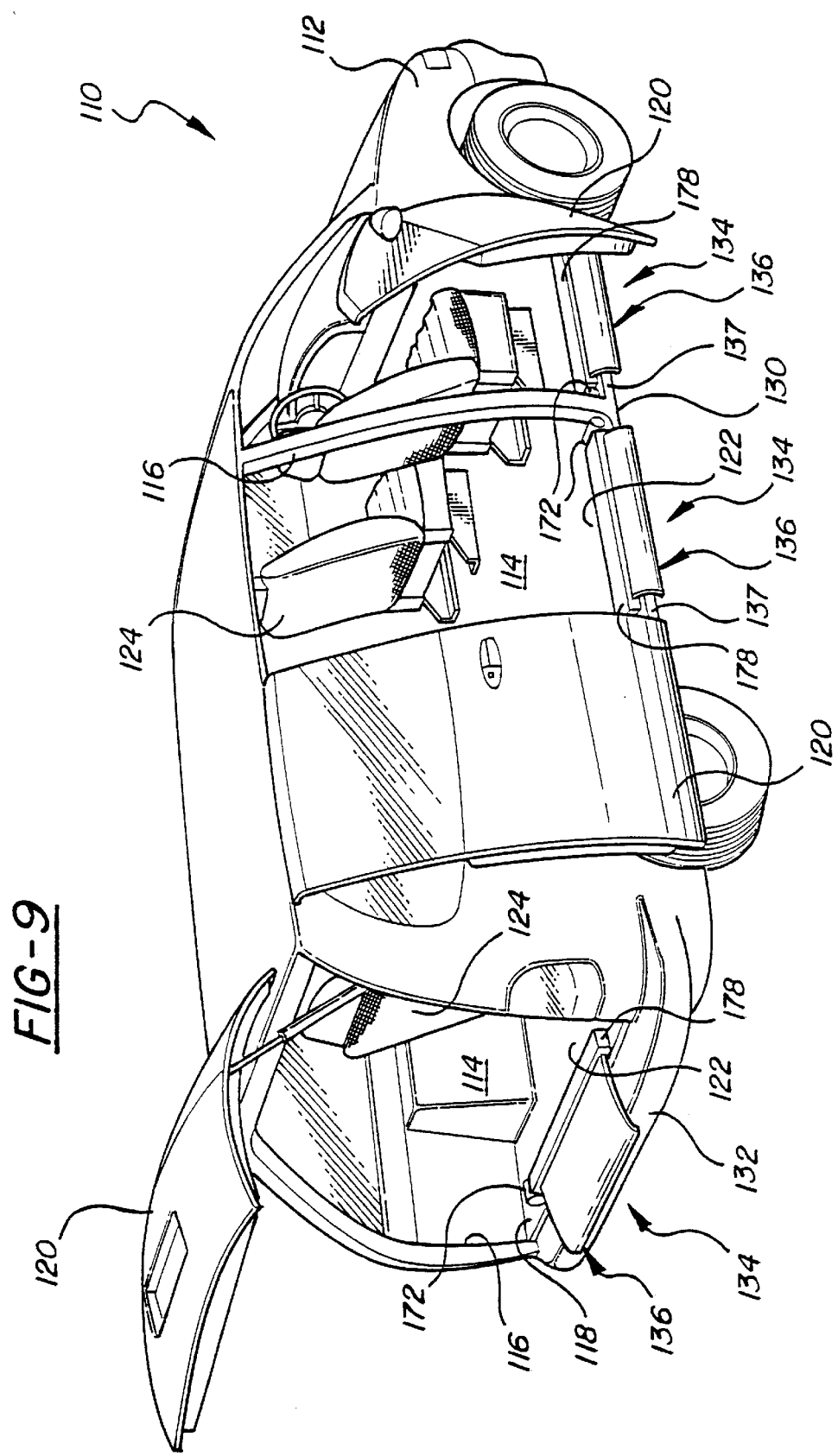
FIG. 9 is an alternative embodiment of the subject invention showing a perspective view of a typical minivan including three clothing protector assemblies disposed one each in the passenger front doorway, the sliding doorway, and in the rear hatch area, and wherein the actuator for the guard includes an electric motor.
Figure 10:
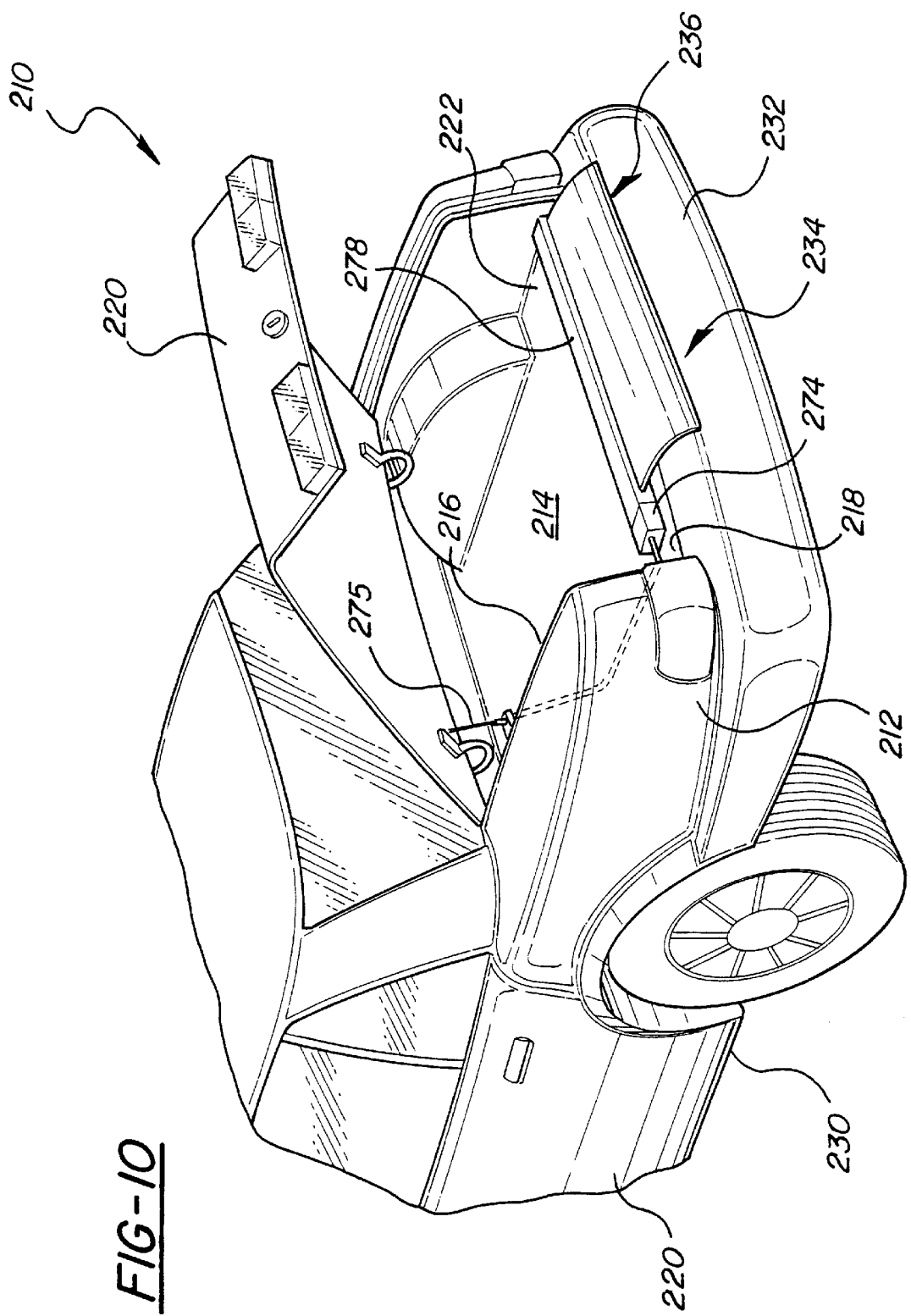
FIG. 10 is yet another alternative embodiment of the subject invention showing a fragmentary perspective view of the trunk area of a typical sedan automobile including a clothing protector assembly disposed along the sill of the trunk area, and wherein the actuator for the guard includes a mechanism controlled by a flexible cable.

Referring to the Figures, wherein like numerals indicate like or corresponding parts throughout the several views, an automobile is generally shown at 10 in FIG. 1. The automobile 10 has an exterior body surface 12 and an interior compartment 14. Preferably, the interior compartment 14 comprises the passenger seating area of the automobile 10; however in an alternative embodiment of the invention, the interior compartment 214 may comprise the trunk or cargo hatch area of the automobile 210, as shown in FIGS. 9 and 10. Hereinafter, corresponding reference numerals in the 100's are used in connection with the alternative embodiment of FIG. 9, corresponding reference numerals in the 200's are used in connection with the alternative embodiment of FIG. 10, and corresponding reference numerals in the 300's are used in connection with the alternative embodiment of FIG. 11.

An opening 16 is formed in the exterior body surface 12. The opening 16 may be a doorway through which people enter and exit the passenger compartment 14, or the opening 116, 216 may be the access to the cargo hatch area 114 or trunk 214. In any case, the opening 16, 116, 216 includes an underlying sill 18, 118, 218, 318, i.e., that structural side of the floor pan, onto which a door, trunk, hatch, or tailgate closes.

A panel 20, 120, 220 is supported on the automobile 10, 110, 210 for movement between an open position allowing human body movement through the opening 16, 116, 216 and a closed position generally covering the opening 16, 116, 216. In the case of panels 20, 120 which comprise doors to enclose the passenger seating compartment 14, 114, they may be hinged upon the automobile 10 to swing in an arcuate path between open and closed positions, or in van-type applications (FIG. 9) slidable between the open and closed positions. However, in the case of panels 120, 220 which comprise trunk lids or hatches for enclosing the cargo hatch area 114 or trunk 214 (FIGS. 9 and 10), such are most usually only hinged upon the automobile 110, 210 to swing in an arcuate path between upwardly open and downwardly closed positions. In the preferred embodiment, the panels 20 comprise doors to the passenger seating compartment 14, and therefore will be addressed as such hereinafter, except when specifically referring to the cargo hatch area 114 or trunk 214 applications shown in FIGS. 9 and 10, or the alternative sill 318 construction shown in FIG. 11. However, those skilled in the art will readily appreciate that all features of the invention described herein are equally applicable to the embodiments shown in FIGS. 9–11, and vice versa.

Figure 2:
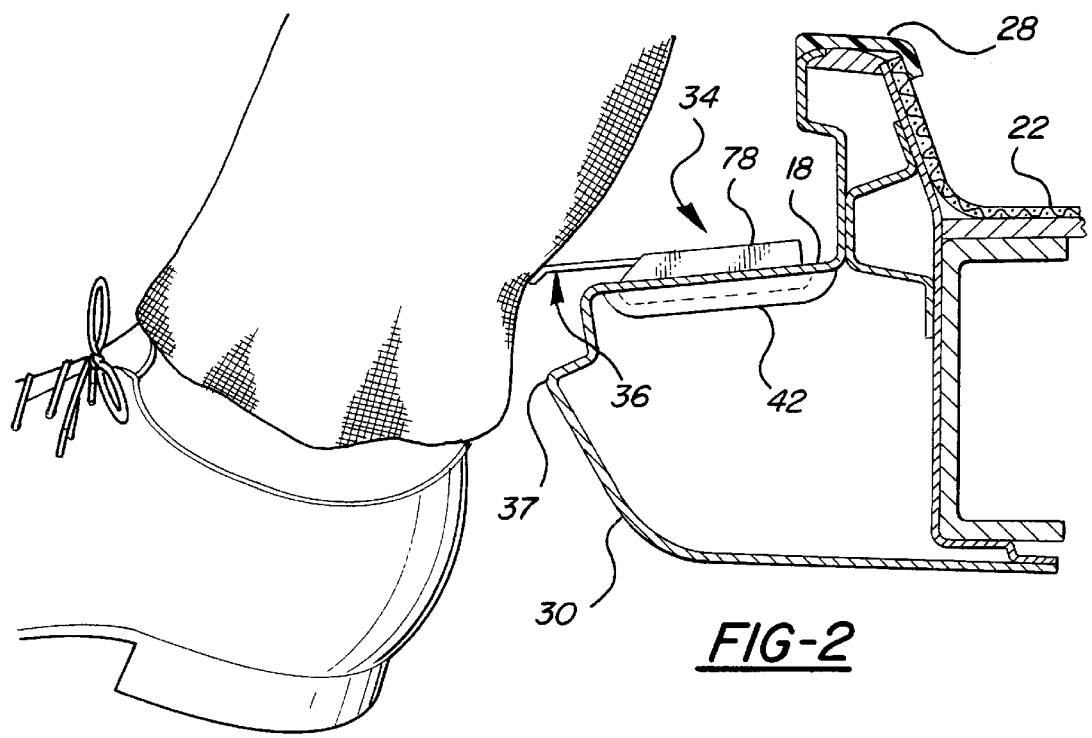
FIG. 2 is a cross-sectional view showing the subject clothing protector assembly in the extended position holding a passenger's pant leg away from the dirty exterior outer sill panel.
Figure 3:
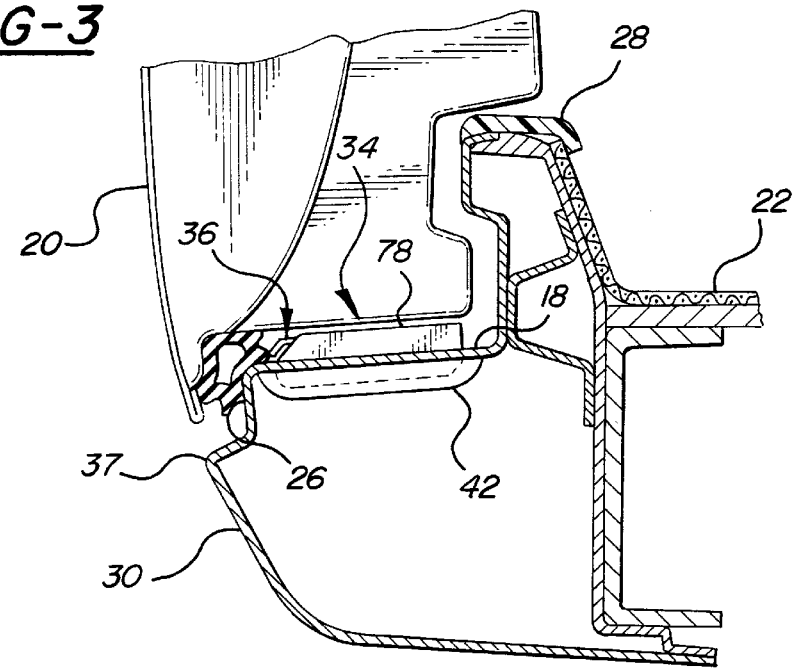
FIG. 3 is a cross-sectional view as in FIG. 2 showing the guard in a retracted position with the automobile door closed.
Figure 11:
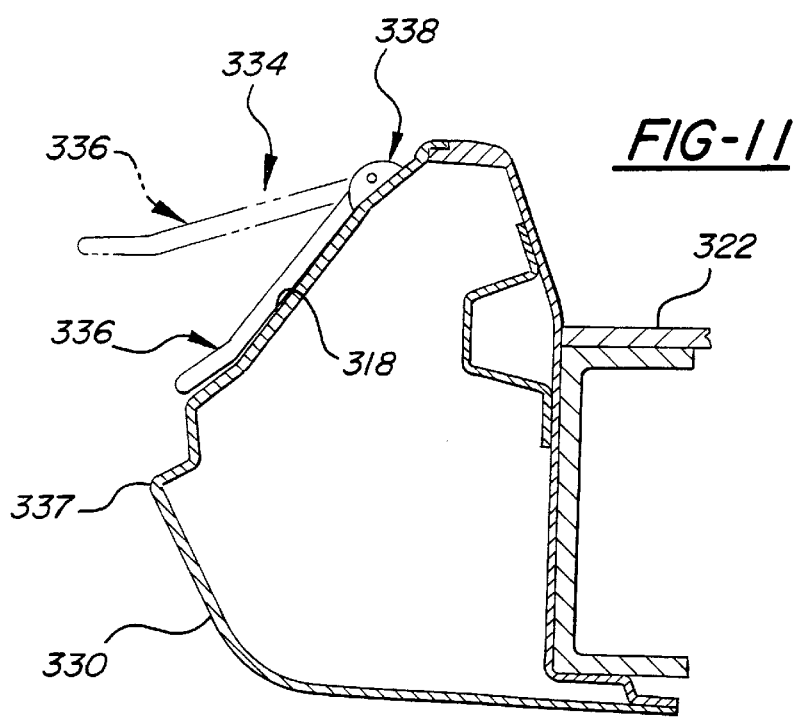
FIG. 11 is a cross-sectional view showing a further alternative embodiment of the subject clothing protector assembly attached to a generally vertical surface of an automobile sill with the guard in the retracted position in solid and pivoted to an extended position in phantom.

Referring to FIGS. 1–3, the passenger compartment 14 includes a floor 22 covered with a carpet-type material (the floor being referenced at 122, 222, and 322 respectfully, in the FIG. 9, 10, and 11 embodiments). Seats 24, 124 are securely fastened to the floor 22 in typical fashion. The door 20 closes against or over the sill 18, protecting the sill 18 from splashing road soils and the like. Sometimes, a weather seal 26 on the inner edge of the door 20 is provided to further limit infiltration of soils onto the sill 18. In many prior art applications, a thin plastic sill plate (not shown) is secured to the door sill 18 and provides a generally nonfunctional decorative feature. Commonly, a plastic upper trim strip 28 covers the cut edge of the carpeting on the floor 22, and extends the entire length of the door opening 16, above the door sill 18. Both the prior art sill plate and the upper trim strip 28 are secured to the floor 14 with threaded fasteners or the like.

The exterior surface 12 of the automobile 10 is naturally susceptible to the collection of soils from the environment, such as dirt, mud, snow, salt, sludge, chemicals, and other debris. These soils often congregate most predominately below the opening 16, along the exterior outer sill panels 30 where the tires tend to discharge, and also about the rear bumper shown at 132 and 232 in FIGS. 9 and 10, respectively of the automobile 10, immediately below the trunk or hatch opening 116.

According to the subject invention, a clothing protector assembly, generally shown at 34 (corresponding to 134, 234, and 334 in the FIGS. 9–11 embodiments, respectively), is provided for protecting a person's shoes and clothes from the dirty exterior surface 12 of the automobile 10 when entering/exiting and loading/unloading cargo from the passenger compartment 14 or loading/unloading cargo from the trunk area 114. The clothing protector assembly 34 is supported on or adjacent the sill 18 and has an elongated blade-like or rail-like guard, generally indicated at 36 (corresponding to 136, 236, and 336 in the FIGS. 9–11 embodiments, respectfully). The guard 36 is moveable between extended and retracted positions. In the extended position, best shown in FIGS. 1 and 2, the guard 36 protrudes outwardly from the opening 16 when the door 20 is in its open position, to hold clothing away from the exterior body surface 12 during human body movement through the opening 16. The guard 36 extends like a canopy beyond the protruding edge 37 (137, 337) of the outer sill panel 30 (130, 230, 330), to provide a buffer against which a person's clothes and shoes are held away from the dirty vehicle exterior 12. The guard 36 moves to the retracted position, best shown in FIGS. 3 and 6, when the door 20 is closed. The outermost edge of the guard 36 may be rounded or bent downwardly.

The clothing protector assembly 34 also includes a base, generally indicated at 38, which is fixedly attached to the automobile 10. The base 38 may be attached either to the upper trim strip 28, or more preferably directly to a horizontal mounting surface of the sill 18. In the alternative embodiment of FIGS. 9 and 10, the base may be attached to the rear bumper of the automobile or further inside the trunk/cargo area. In the alternative embodiment of FIG. 11, the base is attached to a generally vertical section of the sill 318. In other words, attachment of the base 38 directly to the sill 18 is not necessary, but attachment of the base 38 should be near the sill 18. Those skilled in the art will also recognize that the base 38 may be attached as far inside the passenger compartment 14 as to the seat 24, or as far outside the vehicle 10 as a running board or the bumper.

The guard 36 is moveably supported on the base 38. Therefore, attachment directly to the sill 18 is preferred because the extension distance required to extend out and cover the protruding edge 3 7 of the outer sill panel 30 is considerably less than would be required to extend from the upper trim strip 28, i.e., the moving distance of the guard 36 between its extended and retracted positions is smaller and more easily accomplished. Self-locking fasteners (not shown), threaded fasteners 40, or other such fastening elements may be used to attach the base 38 to the sill 18. Although by no means necessary, the sill 18 preferably comprises a horizontal mounting surface having a depressed area 42 as shown in FIGS. 2 and 3 for receiving the base 38 and thereby lowering the height of the assembly 34 to provide better clearance for the door 20 closing thereover. However, those skilled in the art will readily appreciate that a horizontal mounting surface is not required to affix the clothing protector assembly, as shown by the alternative embodiment of FIG. 11 where the sill 318 includes only a generally vertical mounting surface.

Figure 4:
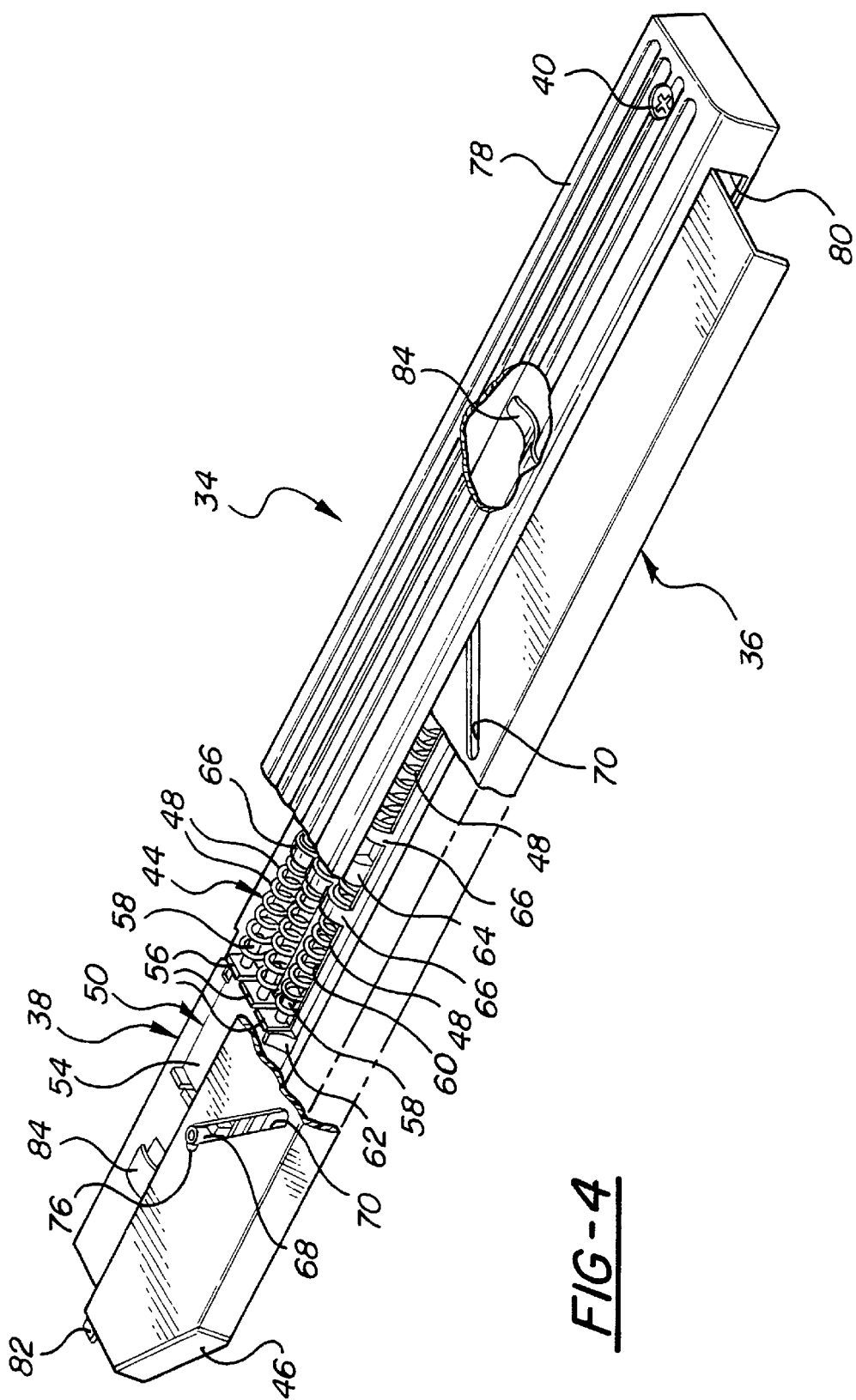
FIG. 4 is a perspective view of the subject clothing protector assembly with the guard extended and the left half of the housing and the center region of the guard removed to illustrate the underlying base, sliders, and springs.
Figure 5:
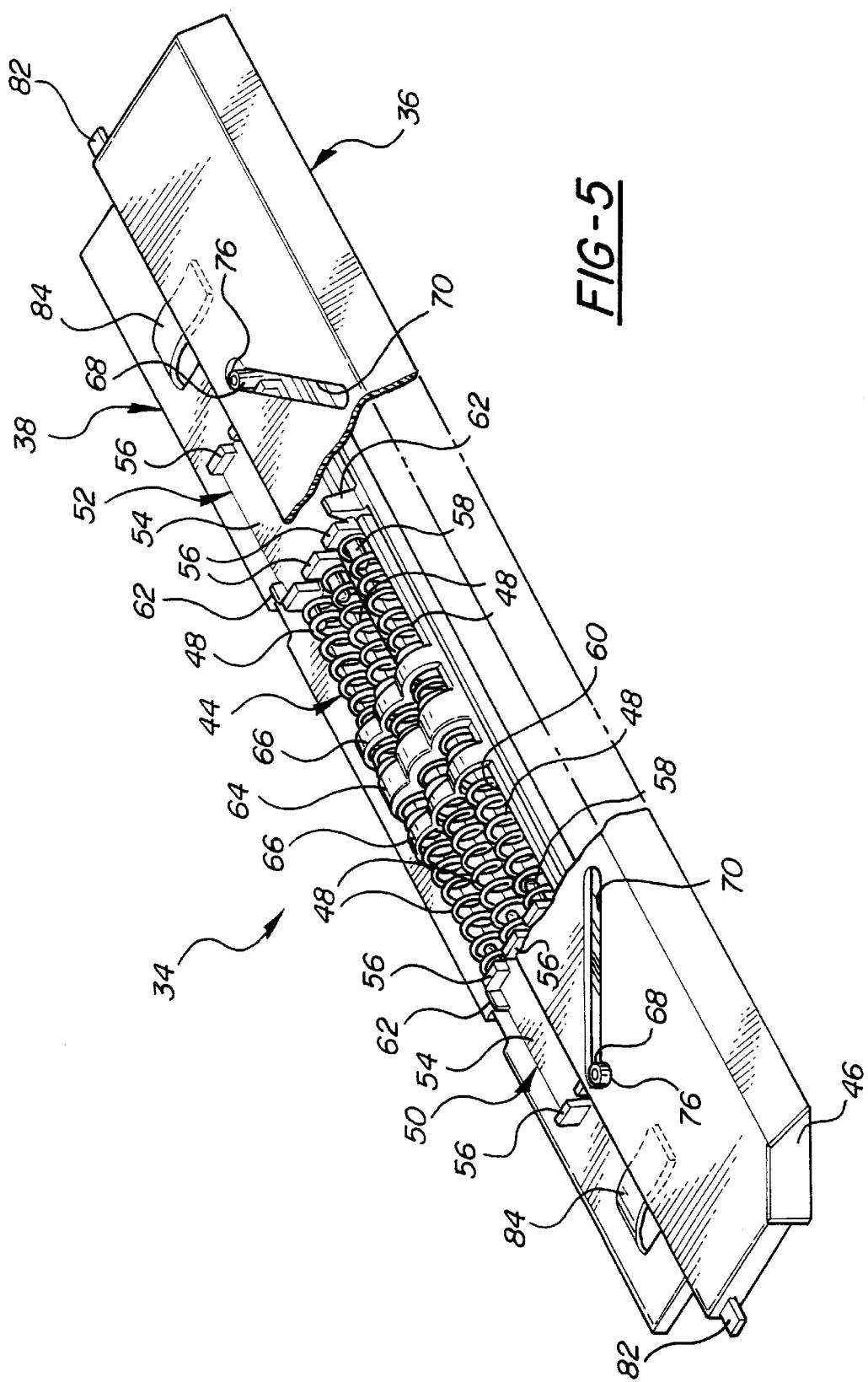
FIG. 5 is a perspective view of the guard and base, showing the guard in an extended position with its center region removed to illustrate the underlying base, sliders, and springs.
Figure 6:
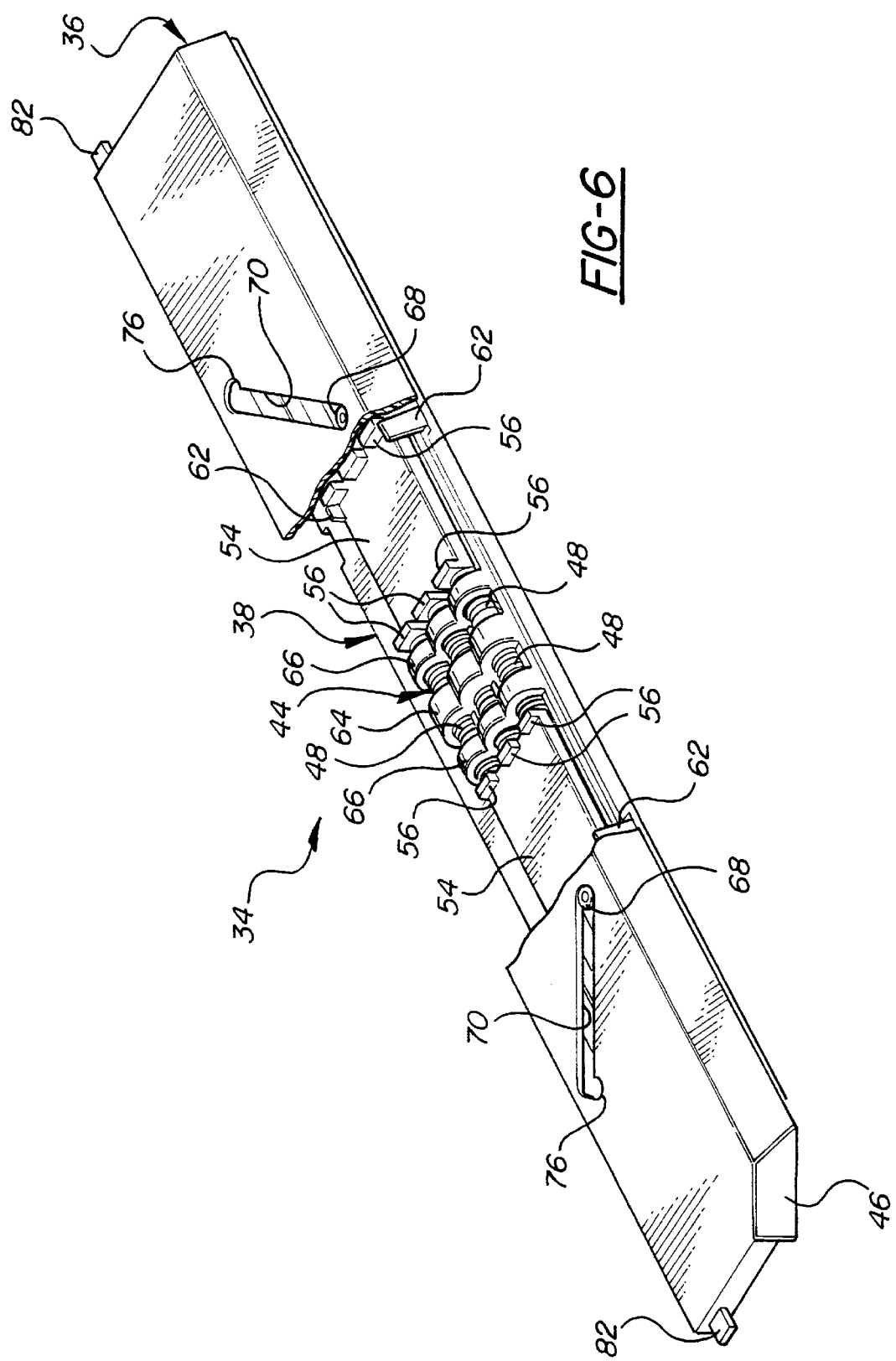
FIG. 6 is a perspective view as in FIG. 5 showing the guard in a retracted position.

An actuator, generally indicated at 44 in FIGS. 4–6, is operatively disposed between the base 38 and the guard 36 for automatically moving the guard 36 between its extended and retracted positions in response to movement of the door 20 between the respective open and closed positions. In other words, the actuator 44 causes the guard 36 to reflexively move to its extended position (FIGS. 1, 2, 4, and 5) when the door 20 is opened, and to return to its retracted position (FIGS. 3 and 6) when the door 20 is closed. Hence, a person need not consciously manipulate the guard 36 but instead the guard 36 automatically extends and retracts with the door 20 via the actuator 44.

In the preferred embodiment illustrated in FIGS. 1–8, the actuator 44 includes one or more compression springs 48 for continuously urging the guard 36 toward its extended position. In this manner, energy is stored in the springs 48 every time the door 20 is closed. As soon as the door 20 is opened, the energy is released in the form of thrusting the guard 36 toward its extended position. As shown in FIGS. 4–6, the actuator 44 includes a first slider, generally indicated at 50, and a second slider, generally indicated at 52, each slidably disposed along the base 38 and operatively connected to the guard 36. The sliders 50, 52 each have a generally flat midsection 54 with three crenellations 56 formed on each of the inner and outer longitudinal ends. Each crenellation 56 adjacent the inner end of each slider 50, 52 includes a spring pilot 58 for positioning the respective spring 48.

The base 38 includes a series of three parallel guide tracks 60 for establishing a predetermined path of sliding movement for each of the sliders 50, 52. The crenellations 56 of the sliders 50, 52 ride in the respective guide tracks 60. The distal, or outer, longitudinal ends of the guide tracks 60 establish the outer limits of slider 50, 52 travel as the respective crenellations 56 abut the outer longitudinal ends. A pair of self-locking retainers 62 extend upwardly from opposite ends of the base 38, adjacent the guide tracks 60, for securing the sliders 50, 52 in the guide tracks 60.

In the preferred embodiment, six springs 48 are provided, three each associated with the respective first 50 and second 52 sliders. Each spring 48 is seated in one of the guide tracks 60, with one end thereof disposed over the corresponding spring pilot 58, and the other end abutting a center divider 64 extending upwardly from the base 38. The center dividers 64 are hooded to help prevent the inner ends of the springs 48 from slipping out of position. The springs 48 each pass under a respective arch 66, also extending from the base 38, for restricting buckling of the springs 48 during compression. In this manner, the springs 48 continuously urge the sliders 50, 52 laterally away from one another, toward and against the outer limits of travel of the sliders 50, 52 as the respective crenellations 56 abut the outer longitudinal ends of the guide tracks 60.

Each slider 50, 52 includes a generally cylindrical cam follower 68 which extends above the crenellations 56. The guard 36 includes a pair of converging angled cam slots 70 operatively connected to the respective cam followers 68, so that longitudinal reciprocating movement of the sliders 50, 52 causes the guard 36 to move laterally toward its extended position. That is, when the guard 36 is in its retracted position (FIGS. 3 and 6), the sliders 50, 52 are disposed proximate the center dividers 64 with the springs 48 fully compressed. In this condition, the cam followers 68 are located at the forward ends of the respective cam slots 70. As the door 20 is opened, the springs 48 release their stored energy, pushing the sliders 50, 52 away from one another and in the process evenly forcing the guard 36 toward its extended position via the cam followers 68 bearing against the cam slots 70.

Figure 7:
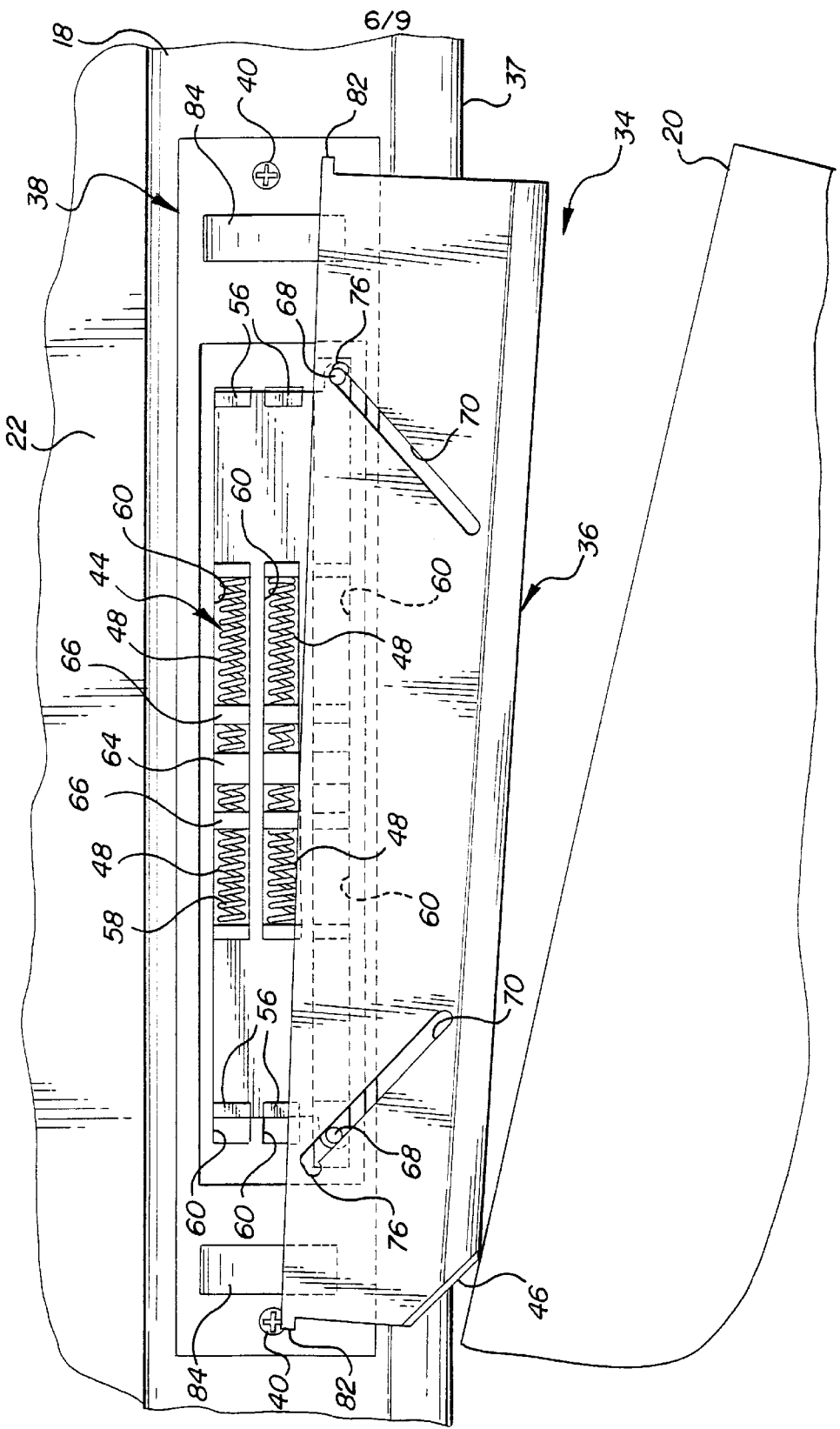
FIG. 7 is a top view of the clothing protector assembly attached to the driver's door sill of an automobile with the guard in an extended position in solid and shown moving toward the retracted position in phantom.

When a pivoted door 20 is closed, as shown in FIG. 7, the forward end of the guard 36 is initially contacted and forced toward the base 38. A rubber bumper 46 or other shock absorbing feature may be provided at the forward end of the guard 36 to enhance durability. Likewise, it may be desirable to attach a durable striking surface to the inside of the door 20. Such pivotal cocking of the guard 36 causes the guard 36 to momentarily pivot or cock relative to the rearward end of the guard, as shown in phantom. This continues until the door 20 is parallel to the outer curled edge of the guard 36, at which time the guard 36 continues toward its retracted position in a sweeping motion. By separately collapsing the forward and rearward ends of the guard 36, lower stresses are placed on the sliders 50, 52 and associated components.

The cam slots 70 may be altered from the linear angles shown in the Figures. For example, the cam slots 70 may be curvilinear or include varying pitch angles to impart different extension/retraction responses in the guard 36. Such altered cam slots 70 can be designed to facilitate the retraction of the guard 36 as it is forced in a cocking fashion by the closing door 20. Or, the altered cam slots 70 may be effective to reduce stresses on the fasteners 40 as a result of reaction forces from the door 20 when the guard 36 is fully retracted. Still further, the altered cam slots 70 can be designed to improve guard 36 extension rates and characteristics.

Those skilled in the art will readily appreciate various and alternative designs, linkages, or mechanisms to move the guard 36 between its extended and retracted positions in response to the door 20 opening and closing. For example, as shown in FIG. 9, the actuator may include an electric motor 172, or a pressurized fluid, i.e., pneumatic or hydraulic, motor (not shown). In the case of an electrically powered motor 172, a switch (not shown) controls energization of the motor 172 in response to the position of the door 120. As the door 120 opens, the switch energizes the motor 172, causing the guard 136 to extend; as the door 120 closes, the switch either de-energizes the motor 172, allowing supplementary springs to return the guard 136 to its retracted position, or the motor 172 reverses polarity and retracts the guard 136 under power. In the case of a pneumatically or hydraulically powered motor, a pressure generating cylinder may be operatively connected to the door 120, which generates a fluid pressure as the door 120 is opened. Fluid conducting hoses (not shown) transfer the fluid pressure to a mechanism which converts the pressure into mechanical motion to forcefully extend the guard 136. As the door 120 closes, the fluid pressure subsides, allowing supplementary springs to return the guard 136 to its retracted position. Of course, those skilled in the art will readily appreciate that supplementary springs can be used to instead automatically extend the guard 136 when the door 120 is opened, and any one of the above-described motors can be used for the sole purpose of retracting the guard 136 in advance of the closing door 120. Furthermore, those skilled in the art will understand that the guard 36 could be designed so as to retract into and out of the rear bumper or some other structure of the body 212.

In still yet another alternative embodiment, illustrated in FIG. 10, the actuator may include a mechanical linkage 274 operatively connected to said trunk 220, as by a flexible motion transmitting cable 275 or the like. According to this alternative method of extending and retracting the guard 236, the cable 275 (or other such mechanical linkage) is tensioned as the trunk 220 is opened. A mechanism, e.g., a bell crank or the like, converts these tensile forces into a thrusting force applied to the guard 236, thereby extending the guard 236. As the trunk 220 closes, the tensile force subsides, allowing supplementary springs to return the guard 236 to its retracted position. Of course, those skilled in the art will readily appreciate that supplementary springs can be used to instead automatically extend the guard 236 when the trunk 220 is opened, and the mechanical linkage 274 can be used for the sole purpose of retracting the guard 236 in advance of the closing trunk 220. Furthermore, those skilled in the art will understand that the guard 236 could be designed so as to retract into and out of the rear bumper or some other structure of the body 212, and likewise so with the embodiment shown in FIG. 9.

The clothing protector assembly 34 preferably includes an extension lock feature, generally indicated at 76 in FIGS. 4–6, for locking the guard 36 in its fully extended position. The extension lock feature 76 increases the resistance to retraction of the guard 36 when in its fully extended position, so that a person may lean more heavily against the guard 36 without causing retraction. In the preferred embodiment, the extension lock feature 76 comprises generally laterally extending pockets in each of the cam slots 70 which retain the corresponding cam followers 68 when the guard 36 is fully extended. The orientation of the pocket is designed to readily facilitate movement of the guard 36 toward the retracted position when the door 20 bears against the forward corner of the guard 36. However, if a person's body bears against the midsection of the guard 36, the pockets are sufficient to resist fairly large forces directed thereagainst.

The extension lock feature 76 permits the springs 48 to be made from significantly less stiff and less expensive materials, while at the same time providing the necessary resistance to retraction when a person bears weight upon the guard 36 during entry/exit or loading/unloading activities. Also, this reduction in the spring 48 resistance results in less abrasion to the inside of the automobile door 20 and less tendency for the fasteners 40, which hold the base 38 to the door sill 18, to be pulled or stripped from their anchor points. Similarly, the entire construction of the assembly 34 can be fabricated from lighter gauge (less expensive) materials. Many other and alternative ways in which to provide the desired extension lock effect are possible. For example, the extension lock feature 76 may comprise spring detents (not shown) positioned to engage a complementary notch in the sliders 50, 52 or the guard 36, and deflect or yield to a force great enough to initially move the guard 36 from its extended position. Alternatively, the actuator mechanisms shown in FIGS. 9 and 10 may inherently provide the desired extension lock effect.

As shown in FIGS. 1–4, the clothing protector assembly 34 includes a sill plate 78 fixed relative to the base 38 and generally shrouding the guard 36 like a housing when it is in the retracted position. The sill plate 78 helps to protect the sliders 50, 52 and springs 48 from contamination, such as with water, ice, or mud from a person's shoes when entering the passenger compartment 14. The sill plate 78 includes an elongated slot 80 through which the guard 36 extends and retracts. The width of the slot 80 is slightly larger than the width of the guard 36 to provide sufficient clearance for the side edges of the guard 36 as it cocks during closing (FIG. 7). To prevent over overextension of the guard 36 from the extended position, stop tabs 82 may project from both sides of the guard 36, as shown in FIGS. 4–6. The sill plate 78 may have the appearance details of a typical (static) prior art sill plate trim piece so as to blend unnoticeably into the sill 18 area. The corresponding sill plate in the FIG. 9 and 10 embodiments is referenced at 178 and 278, respectively.

The clothing protector assembly 34 includes at least one, and preferably four, resilient support elements 84 engaging the guard 36 for elastically supporting and yielding the guard 36 relative to the base 38 upon adverse loading thereto. Two such resilient support elements 84 are positioned below the guard 36, and the other two resilient support elements 84 are positioned above the guard 36. The resilient support elements 84 may take the form of simple cantilever leaf or bow springs manufactured from spring steel or, as shown in FIGS. 4 and 5, integrally molded with the base 38 and sill plate 78 from plastic. As a person enters or exits the automobile, a foot may inadvertently snag or clip the guard 36, illustrated in FIG. 8, forcing it to bend upwardly or downwardly. In order to prevent damage to the assembly 34 or the automobile 10 during such occurrence, the resilient support elements 84 provide a degree of flexibility to the guard 36.

The clothing protector assembly 34 may incorporate numerous convenience and novelty features. For example, a simple disabling feature (not shown) may be used to lock the guard 36 in its retracted position even when the door 20 is open. Or, the guard 36 may include a replaceable cover sheet or member having indicia printed or embossed thereon. The indicia may be of a fanciful artistic representation, popular cartoon characters, advertising logos, sporting team logos, etc. The assembly 34 may also include an illumination means (not shown) for illuminating the guard when it is in its extended position. The illumination means may comprise any form of illuminating elements, such as a series of light emitting diodes (LEDs) housed internally of a translucent guard. A power source, such as the existing automobile battery or a disposable dry cell battery, can energize the LEDs. A switch (not shown) may be used to conduct electricity to the LEDs and thereby cause general illumination of the guard 36 whenever the door 20 is opened. It may prove desirable to provide a lens feature on the bottom of the guard 36 to direct or focus the emitted light at the ground area directly beneath the extended guard 36 to facilitate ingress and egress of the passenger. Those skilled in the art will readily appreciate that the illumination means may take many other forms than the preferred manner described above. Similarly, the assembly 34 may also include a speaker means (not shown) for playing a prerecorded sound or series of sounds when the guard 36 is in its extended position. Those skilled in the art will understand the microchip components and other attendant hardware to implement such a feature, or even use of the automobile's existing audio system. The prerecorded message can be a popular music clip, a special sound effect, or a phrase such as "Please watch your step". Preferably, the speaker means operates from the same electrical circuitry as does the illumination means, however such is not necessary and the speaker means can be incorporated independently of the illumination means.

In FIG. 11, an alternative construction of the clothing protector assembly 334 is adapted for use with a sill area 318 which does not have a suitable horizontal mounting surface for the base 338. In this embodiment, the sill 318 has a generally vertical or steeply inclined mounting surface. The base 338 may be affixed to the sill 318 adjacent its upper edge, and the guard 336 hingedly attached to the base 338 for pivotal movement about a generally horizontal axis. Springs (not shown) continuously urge the guard 336 toward the extended position (shown in phantom). When the vehicle door (or trunk or hatch) closes, the guard 336 is forcibly pivoted back to the retracted position. Of course, those skilled in the art will readily appreciate that a powered actuator, e.g., a mechanical linkage to the door, an electric motor, or a pressurized fluid motor, etc., could be incorporated into the clothing protector assembly 334 to return the guard 336 to its retracted position before the door closes against it, similar to those designs shown in FIGS. 9 and 10.

The subject invention also discloses a method for protecting clothing from the dirty exterior surface 12, 112, 212 of an automobile 10, 110, 210 which is susceptible to the collection of soils, the exterior surface 12, 112, 212 including an opening, e.g., a standard doorway 16, or the opening 116, 216 for a cargo hatch 114 or trunk 214, and an underlying sill 18, 118, 218. The method includes the steps of supporting a panel, e.g., a door 20 or hatch 120 or trunk 220, on the automobile 10, 110, 210 for movement between an open position allowing human body movement through the opening 16, 116, 216 and a closed position generally covering the opening 16, 116, 216, and extending a guard 36, 136, 236 outwardly from the opening 16, 116, 216 when the panel 20, 120, 220 is in its open position to hold clothing away from the exterior body surface 12, 112, 212 during human body movement through the opening 16, 116, 216 and also retracting the guard 36, 136, 236 to a protected position when the door 20, 120, 220 is in its closed position.

Figure 8:
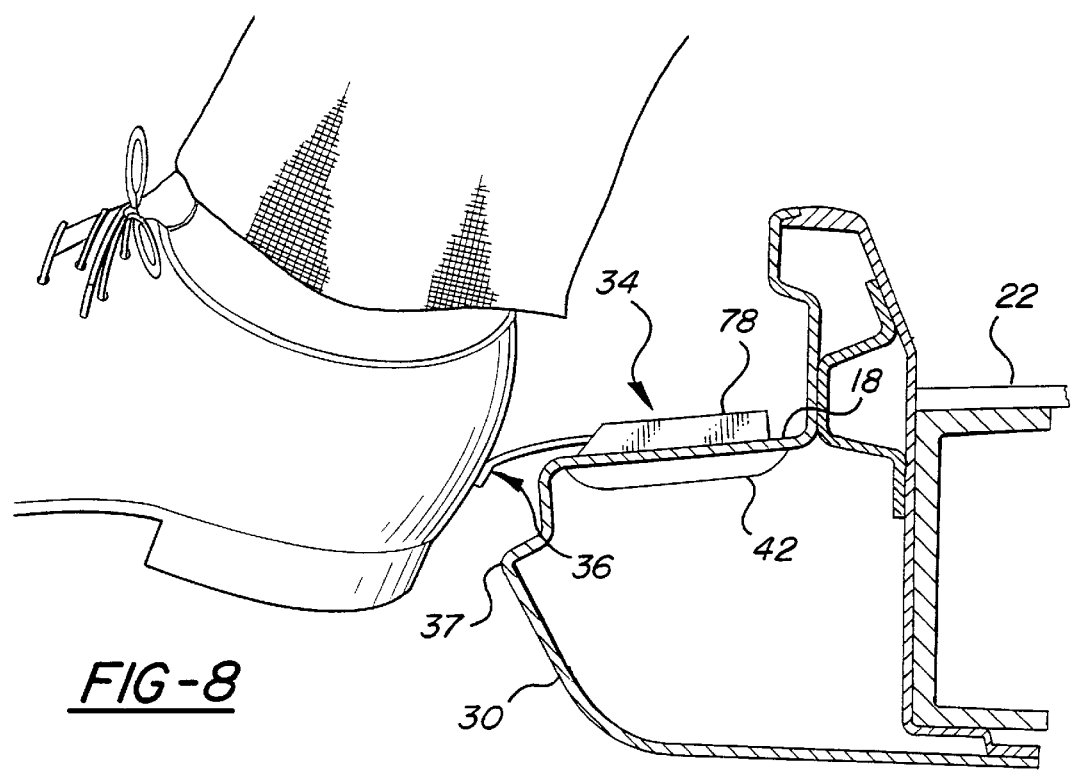
FIG. 8 is a cross-sectional view as in FIG. 2 showing a person's foot inadvertently stepping on and resiliently deflecting the extended guard.

In the preferred embodiment, the extending and retracting steps include automatically moving the guard 36 in response to movement of the door 20 between the respective open and closed positions. The guard 36 is held in the retracted position of FIGS. 3 and 6 by the closed door 20. In this condition, the clothing protector assembly 34 is compactly nested with the base 38 and guard 36, together with the sliders 50, 52 and springs 48, concealed within the sill plate 78. When the door 20 is opened, the stored energy in the springs 48 is released, thereby thrusting the guard 36 toward its extended position, as shown in FIGS. 1, 2, 4, and 5. In this position, the combined resistance of the springs 48 is sufficient to hold a passenger's clothing away from the soiled protruding edge 37 of the exterior outer sill panel 30. The extending step may include locking the guard 36 in the fully extended position with a extension lock feature 76. The extending step may also include elastically yielding the guard 36 upon adverse loading thereto by way of resilient support elements 84, as shown in FIG. 8.

It is considered most advantageous to position the assembly 34 as far to the rear of the sill 18 as possible in a standard pivoting door 20 type application, so as to provide adequate guard 36 coverage under the center of gravity, or so-called H-point, of a seated occupant to protect the clothes and shoes when exiting the passenger compartment 14. Furthermore, openings 20 of various automobiles and dimensions can be adequately accommodated by forming the guard 36 of a corresponding length as is necessary to provide proper protection. For example, a two-door body style automobile 36 will require a substantially longer guard to provide protection for the passengers entering and exiting the rear seat area as well as for the front seat area passengers. However, a much shorter length guard will generally suffice for a four-door model automobile 36.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An automobile (10) and clothing protector assembly (34) combination, said combination comprising:
    an automobile (10) having an exterior body surface (12) susceptible to collection of soils and an opening (16) formed in said exterior body surface (12), said opening (16) including a sill (18);
    a panel (20) supported on said automobile (10) for movement between an open position allowing human body movement through said opening (16) and a closed position generally covering said opening (16); and
    a clothing protector assembly (34) supported adjacent said sill (18) and having a guard (36) moveable between an extended position protruding outwardly from said opening (16) when said panel (20) is in said open position to hold clothing away from said exterior body surface (12) during the human body movement through said opening (16) and a retracted position when said panel (20) is in said closed position.

2. A combination as set forth in claim 1 wherein said clothing protector assembly (34) further includes a base (38) fixedly attached to said automobile (10).

3. A combination as set forth in claim 2 wherein said sill (18) includes a horizontal mounting surface, and said base (38) is fixedly attached to said horizontal mounting surface of said sill (18).

4. A combination as set forth in claim 2 wherein said sill (318) includes a generally vertical mounting surface, and said base (338) is fixedly attached to said generally vertical mounting surface of said sill (318).

5. A combination as set forth in claim 4 wherein said guard (336) pivots about a generally horizontal axis away from said sill (318) as said guard (336) moves toward said extended position.

6. A combination as set forth in claim 2 wherein said clothing protector assembly (34) further includes an actuator (44) operatively disposed between said base (38) and said guard (36) for automatically moving said guard (36) between said extended and retracted positions in response to the movement of said panel (20) between said respective open and closed positions.

7. A combination as set forth in claim 6 wherein said actuator includes an electric motor (172).

8. A combination as set forth in claim 6 wherein said actuator includes a pressurized fluid motor.

9. A combination as set forth in claim 6 wherein said actuator includes a mechanical linkage (274) operatively connected to said panel (220).

10. A combination as set forth in claim 6 wherein said actuator (44) includes at least one biasing member (48) for continuously urging said guard (36) toward said extended position.

11. A combination as set forth in claim 10 wherein said actuator (44) further includes a first slider (50) slidably disposed along said base (38) and operatively connected to said guard (36), and wherein said biasing member (48) includes at least one spring (48) for urging said first slider (50) toward an extended position corresponding to said extended position of said guard (36).

12. A combination as set forth in claim 11 wherein said base (38) includes a guide track (60) for establishing a predetermined path of sliding movement for said first slider (50).

13. A combination as set forth in claim 12 wherein said base (38) further includes a self-locking retainer (62) for slidably attaching said first slider (50) to said guide track (60).

14. A combination as set forth in claim 13 wherein said first slider (50) includes a spring pilot (58) for coupling to said spring (48).

15. A combination as set forth in claim 11 wherein said first slider (50) includes a cam follower (68) and said guard (36) includes a cam slot (70) operatively connected to said cam follower (68).

16. A combination as set forth in claim 11 wherein said actuator (44) further includes a second slider (52) slidably disposed along said base (38) and operatively connected to said guard (36).

17. A combination as set forth in claim 6 wherein said clothing protector assembly (34) further includes a extension lock feature (76) for locking said guard (36) in said extended position.

18. A combination as set forth in claim 6 wherein said panel (20) is pivotally connected relative to said opening (16) for movement in an arcuate path between said open and closed positions.

19. A combination as set forth in claim 6 wherein said panel (120) is slidably connected relative to said opening (116) for moving between said open and closed positions.

20. A combination as set forth in claim 2 wherein said clothing protector assembly (34) further includes at least one resilient support element (84) engaging said guard (36) for elastically yielding said guard (36) relative to said sill (18) upon adverse loading thereto.

21. A combination as set forth in claim 2 wherein said clothing protector assembly (34) further includes a sill plate (78) fixed relative to said base (38) and generally shrouding said guard (36) in said retracted position.

22. A clothing protector assembly (34) for an automobile (10) of a type having an exterior body surface (12) and a panel (20) moveably mounted in an opening (16) between respective open and closed positions with a sill (18), said clothing protector assembly (34) comprising:
 a base (38) for attaching to the automobile (10) adjacent the sill (18); and
 a guard (36) moveably supported on said base (38) between an extended position for protruding outwardly from the opening (16) to hold clothing away from the exterior body surface (12) of the automobile (10) during human body movement through the opening (16) and a retracted position.

23. An assembly as set forth in claim 22 further including an actuator (44) operatively disposed between said base (38) and said guard (36) for automatically moving said guard (36) between said extended and retracted positions in response to movement of said panel (20) between said respective open and closed positions.

24. An assembly as set forth in claim 23 wherein said actuator includes an electric motor (172).

25. An assembly as set forth in claim 23 wherein said actuator includes a pressurized fluid motor.

26. An assembly as set forth in claim 23 wherein said actuator includes a mechanical linkage (274) for operatively connecting to the automobile panel (220).

27. An assembly as set forth in claim 23 wherein said actuator (44) includes at least one biasing member (48) for continuously urging said guard (36) toward said extended position.

28. An assembly as set forth in claim 23 wherein said actuator (44) further includes a first slider (50) slidably disposed along said base (38) and operatively connected to said guard (36), and wherein said biasing member (48) includes at least one spring (48) for urging said first slider (50) toward an extended position corresponding to said extended position of said guard (36).

29. An assembly as set forth in claim 28 wherein said base (38) includes a guide track (60) for establishing a predetermined path of sliding movement for said first slider (50).

30. An assembly as set forth in claim 29 wherein said base (38) further includes a self-locking retainer (62) for slidably attaching said first slider (50) to said guide track (60).

31. An assembly as set forth in claim 30 wherein said first slider (50) includes a spring pilot (58) for coupling to said spring (48).

32. An assembly as set forth in claim 31 wherein said first slider (50) further includes a cam follower (68) and said guard (36) includes a cam slot (70) operatively connected to said cam follower (68).

33. An assembly as set forth in claim 28 further including a second slider (52) slidably disposed along said base (38) and operatively connected to said guard (36).

34. An assembly as set forth in claim 23 further including an extension lock feature (76) for locking said guard (36) in said extended position.

35. An assembly as set forth in claim 22 further including at least one resilient support element (84) engaging said guard (36) for elastically yielding said guard (36) relative to said base (38) upon adverse loading thereto.

36. An assembly as set forth in claim 22 further including a sill plate (78) fixed relative to said base (38) and generally shrouding said guard (36) in said retracted position.

37. A clothing protector assembly (34) for an automobile (10) of a type having a door (20) moveably mounted in an opening (16), said clothing protector assembly (34) comprising:

a sill plate (78) for attaching in the opening (16) of the automobile (10); and a guard (36) moveably supported relative to said sill plate (78) for extending between an extended position for protruding outwardly from said sill plate (78) to hold clothing away from the automobile (10) during human body movement through the opening (16) and a retracted position at least partially enshrouded by said sill plate (78).

38. A method for protecting clothing from a dirty exterior body surface (12) of an automobile (10), said method comprising the steps of:

forming an opening (16) in the exterior body surface (12) of the automobile (10), the opening (16) including a sill (18);

supporting a panel (20) on the automobile (10) for movement between an open position allowing human body movement through the opening (16) and a closed position generally covering the opening (16); and extending a guard (36) outwardly from the opening (16) to an extended position when the panel (20) is in the open position thereof to hold the clothing away from the exterior body surface (12) during the human body movement through the opening (16) and retracting the guard (36) to a protected position when the panel (20) is in the closed position thereof.

39. A method as set forth in claim 38 wherein said extending and retracting steps include automatically moving the guard (36) in response to the movement of the panel (20) between the respective open and closed positions.

40. A method as set forth in claim 39 wherein said extending step further includes locking the guard (36) in the extended position.

41. A method as set forth in claim 38 wherein said extending step includes elastically yielding the guard (36) upon adverse loading thereto.

\* \* \* \* \*

UNITED STATES PATENT AND TRADEMARK OFFICE
CERTIFICATE OF CORRECTION

PATENT NO. : 6,196,623 B1
DATED : March 6, 2001
INVENTOR(S) : Jon E. Shackelford, Joseph W. Tasch, Gregory E. Price It is certified that error appears in the above-identified patent and that said Letters Patent is hereby corrected as shown below:

Column 5,
Line 19, change "3 7" to -- 37 --.

Column 7,
Line 62, change "comer" to -- corner --.

Column 8,
Line 6, change "3 8" to -- 38 --.

Column 10,
Line 22, delete "36";
Line 26, delete "36".

Signed and Sealed this

Sixth Day of November, 2001

Attest:

NICHOLAS P. GODICI
*Attesting Officer*  *Acting Director of the United States Patent and Trademark Office*